United States Patent

Schunk

(10) Patent No.: US 9,075,123 B2
(45) Date of Patent: Jul. 7, 2015

(54) SYSTEM AND METHOD FOR RADIO-BASED LOCALIZATION OF A TERMINAL DEVICE

(75) Inventor: Thorsten Schunk, Bruggen (DE)

(73) Assignee: Vodafone Holding GmbH, Dusseldorf (DE)

( * ) Notice: Subject to any disclaimer, the term of this patent is extended or adjusted under 35 U.S.C. 154(b) by 24 days.

(21) Appl. No.: 14/007,352

(22) PCT Filed: Mar. 26, 2012

(86) PCT No.: PCT/EP2012/055346
§ 371 (c)(1),
(2), (4) Date: Dec. 10, 2013

(87) PCT Pub. No.: WO2012/130810
PCT Pub. Date: Oct. 4, 2012

(65) Prior Publication Data
US 2014/0087755 A1    Mar. 27, 2014

(30) Foreign Application Priority Data

Mar. 25, 2011    (DE) .......................... 10 2011 006 181

(51) Int. Cl.
*G01S 5/00* (2006.01)
*G01S 5/02* (2010.01)
(Continued)

(52) U.S. Cl.
CPC ............. *G01S 5/0063* (2013.01); *G01S 5/0252* (2013.01); *H04W 64/00* (2013.01); *H04W 84/12* (2013.01)

(58) Field of Classification Search
CPC .... G01S 5/0063; G01S 5/0252; H04W 84/12; H04W 64/00

USPC ................................ 455/440, 456.1, 456.2
See application file for complete search history.

(56) References Cited

U.S. PATENT DOCUMENTS

| | | |
|---|---|---|
| 6,295,455 B1 * | 9/2001 | Fischer et al. ............. 455/456.2 |
| 2005/0078626 A1 | 4/2005 | Ogino et al. |
| 2005/0192029 A1 * | 9/2005 | Aigner et al. ............. 455/456.5 |

(Continued)

OTHER PUBLICATIONS

International Preliminary Report on Patentability Including Written Opinion for International (PCT) Patent Application No. PCT/EP2012/055346, filing date Mar. 26, 2012, 6 pages, English Translation.

(Continued)

*Primary Examiner* — Dinh P Nguyen
(74) *Attorney, Agent, or Firm* — International IP Law Group, PLLC

(57) ABSTRACT

The techniques described herein relate to a system for the localization of a terminal device using radio signals from radio access points that have been received in the terminal device. The system comprises a unit for providing localization information pertaining to the radio signals from the radio access points, whereby the localization information can be used for the localization of the terminal device. Moreover, the system comprises at least a first radio access point that is connected to the unit via a communication connection and that is configured in such a way that information that is representative of components of the localization information is transmitted to the unit. In this context, the first radio access point can acquire reference signal pattern data for a localization on the basis of pattern recognition, and the transmit power that can be employed for a lateration procedure. In addition to the system, the techniques described herein also proposes a method for the localization of a terminal device.

13 Claims, 2 Drawing Sheets

(51) Int. Cl.
*H04W 84/12* (2009.01)
*H04W 64/00* (2009.01)

(56) References Cited

U.S. PATENT DOCUMENTS

| | | |
|---|---|---|
| 2008/0130604 A1 | 6/2008 | Boyd |
| 2008/0144580 A1* | 6/2008 | Su et al. .................. 370/332 |
| 2009/0129354 A1* | 5/2009 | Gupta et al. ............. 370/338 |
| 2010/0298008 A1 | 11/2010 | Burroughs |
| 2012/0033572 A1 | 2/2012 | Bamberger |

OTHER PUBLICATIONS

PCT International Search Report, dated May 24, 2012, for PCT Application PCT/EP2012/055346, Filed Mar. 26, 2013, German with English Translation.
PCT International Preliminary Report on Patentability, May 21, 2013 (German).

* cited by examiner

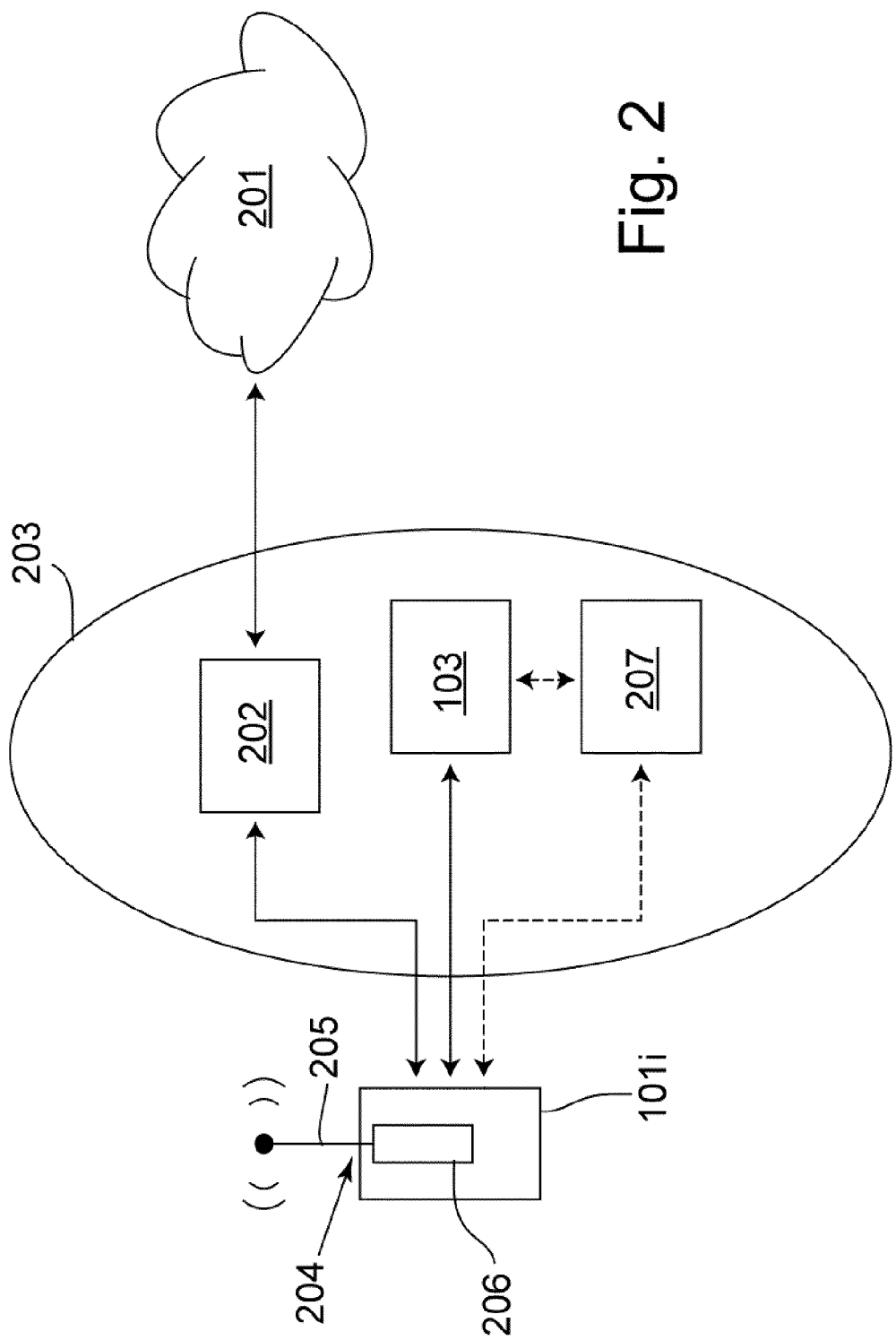

SYSTEM AND METHOD FOR RADIO-BASED LOCALIZATION OF A TERMINAL DEVICE

CROSS-REFERENCE TO RELATED APPLICATION

Pursuant to 35 U.S.C. §371, this application is the United States National Stage Application of International Patent Application No. PTC/EP2012/055346, filed on Mar. 26, 2012, the contents of which are incorporated by reference as if set forth in their entirety herein, which claims priority to German (DE) Patent Application No. 102011006181.9, filed Mar. 25, 2011, the contents of which are incorporated by reference as if set forth in their entirety herein.

BACKGROUND

A number of radio-based measuring methods are known for the localization of mobile terminal devices such as, for example, smartphones, notebook computers and other mobile communication terminal devices, and these measuring methods can determine the approximate position of a terminal device on the basis of received radio signals. Such methods include localization by a Satellite-Assisted GPS (Global Positioning System) or similar satellite navigation systems. Moreover, signals received in the terminal devices from access points to radio networks can be used for localization purposes. Some methods use the base stations of mobile radio networks as access points. Other methods use radio signals from Wi-Fi or WLAN (Wireless Local Area Network) access points in order to locate terminal devices (the terms Wi-Fi and WLAN are used here synonymously).

In comparison to localization via satellite navigation systems, if there is adequate WLAN coverage of the area where the terminal device that is to be located is present, Wi-Fi-based methods have the advantage that localization is also possible inside buildings, especially department stores, shopping malls, convention centers, airports and the like, where the signals from satellite navigation systems often cannot be received. Moreover, the position of the terminal device, especially in densely built-up areas with poor reception conditions for satellite signals, can often be determined more accurately than with the GPS system, which is currently the only usable satellite navigation system.

The Wi-Fi radio signals used for the localization are, as a rule, so-called beacon signals that are transmitted at regular time intervals by the Wi-Fi access points and that contain an identifier that is unambiguously associated with the access point in question. In this context, this can be a BSSID (Basic Service Set Identification) of the Wi-Fi access point that corresponds to an unambiguous MAC (Media Access Control) address of the access point.

Wi-Fi-based localization methods can be based on lateration. Here, the position of the terminal device is determined as the intersection of three circles in each of whose mid-points there in an access point and whose radii correspond to the distance to the access point. The positions of the access points are determined in advance and they serve as input quantities for the lateration. One way to determine the distances to the access points is offered by the so-called RSS (Received Signal Strength) methods in which the distance to an access point is determined on the basis of the strength of a signal from the access point that has been received by the terminal device, taking into account the transmit power of the access point. With this type of lateration, inaccuracies in the determination of the location arise especially due to the fact that the transmit power of the Wi-Fi access points is generally not precisely known, since not all access points transmit with the same power, and due to the fact that attenuations of the signal caused by objects between the access point and the terminal device are not taken into consideration.

So-called pattern recognition methods can be employed as additional Wi-Fi-based localization methods. The basis of these methods is that a received radio signal pattern containing the signal strengths of the received Wi-Fi signals is compared to reference signal patterns that have been detected in advance. In the case of the pattern recognition methods, the place where the reference pattern having the greatest correspondence with the detected signal pattern was measured is the place that can be assumed as being the position of the terminal device, or else the position is determined on the basis of several reference patterns having a great degree of correspondence as well as on the basis of the associated positions, as a result of which positions of the terminal device between the detection sites of the reference patterns can be determined as locations.

In order to detect the localization information that is used for the Wi-Fi-based localization of terminal devices, measuring drives can be carried out during which measuring vehicles are used to detect the signal strengths of the received signals, the associated identifiers of the Wi-Fi access points as well as the associated positions that can be determined, for example, by GPS. With this approach, which is also known by the term "wardriving", the reference signal patterns and the associated positions can be detected directly and can be stored in a database that can be accessed in order to determine the positions of terminal devices on the basis of pattern recognition.

Here, however, the drawback arises that the distribution of Wi-Fi access points often changes, especially in densely populated areas with a large number of privately used Wi-Fi access points, since new access points are often installed and existing access points are removed, and the signal propagation for the radio signals from existing access points can also change due to changes in building structures. This calls for frequent measuring drives for data maintenance, and this is very laborious. As a matter of principle, changes that are highly dynamic such as, for example, the switching on and off of access points by their users, cannot be taken into consideration at all by measuring drives. Moreover, other solutions are needed in order to acquire localization information in interior spaces, especially since there are often no positioning systems such as GPS available in such spaces.

The acquisition of the input data for the localization by lateration can be done, for example, manually if operators or users of Wi-Fi access points indicate the position of their access points and their identifiers, which are then stored in a database. Here, the problem exists that the information provided by the users can be inadvertently or intentionally erroneous, and that information about changes in the installation site of an access point, for example, because a user has moved, is often forgotten, thus resulting in an erroneous database. Moreover, even though the detection of changes in the operating state of radio access points is fundamentally possible, in actual practice, this cannot be carried out reliably, since it cannot be ensured that the users will consistently indicate the changes in the operating state.

Furthermore, in order to carry out lateration with high precision, there is a need for precise information about the transmit power of the radio access points. As a rule, however, determining this requires the users to have above-average knowledge about the technology of the radio access points that they use. Consequently, a database that is drawn up on the basis of manual input by users of radio access points generally cannot be augmented with reliable information about the transmit power of the access points taken into account by the database. U.S. Patent Application 2010/0298008 A1 discloses, for example, such above-mentioned techniques for determining the position of mobile stations.

SUMMARY

The techniques described herein relate to the radio-based localization of terminal devices. In this context, the techniques described herein relate to a system and to a method for the localization of a terminal device by radio signals from radio access points, especially Wi-Fi access points.

It is an objective of the present techniques described herein to overcome at least one of the above-mentioned drawbacks of the state of the art and, in this manner, to improve the radio network-based localization of mobile terminal devices.

According to a first aspect of the techniques described herein, a system is proposed for the localization of a terminal device using radio signals from radio access points that have been received in the terminal device. The system comprises a unit for providing localization information pertaining to the radio signals from the radio access points, whereby the localization information can be used for the localization of the terminal device. Moreover, the system comprises at least a first radio access point that is connected to the unit via a communication connection and that is configured in such a way that information that is representative of components of the localization information is transmitted to the unit.

According to another aspect of the techniques described herein, a method is created for acquiring localization information pertaining to radio signals from radio access points. The localization information can be provided by a unit and can be used for the localization of the terminal device by the radio signals from the radio access points. The method is characterized in that information that is representative of components of the localization information is transmitted to the unit by a first radio access point via a communication connection.

The techniques described herein thus make it possible to acquire localization information by radio access points that, in contrast to the measuring vehicles used in wardriving, are essentially present permanently at the detection site. In this manner, the localization information can especially be continuously kept up to date. Moreover, configuration parameters such as the transmit power, which cannot be readily measured or ascertained by a user, or in some other way externally—for example, because the use does not have access to the parameter is subject to automatic adaptations by the radio access points—can be read out from the radio access points. As a rule, the radio access points normally already have a network connection that can be used to establish the communication connection to the unit that provides the localization information. Advantageously, the techniques described herein thus allow an already existent infrastructure to also be "made use of" for acquiring components of the localization information or of information that is representative thereof.

In one embodiment, the radio access points are configured as Wi-Fi access points that especially operate according to a standard of the IEEE 802.11 family. The radio access points can be operated, by the customers of a data service provider that is accessed via the radio access points, for example, in their residences or at their business premises. By the same token, these can be, for example, radio access points that are operated in public places. In another embodiment, these are radio access points of a mobile radio network, especially a 2G, 3G, or 4G network. These can especially also be radio access points that generate so-called micro or pico radio cells that have a relatively small spatial dimension. Such radio access points can be operated, among other things, like Wi-Fi access points in residential or business premises, or else locally in certain public places that otherwise do not have sufficient coverage by a mobile radion network. However, the techniques described herein are by no means limited to such micro or pico radio cells, but rather, fundamentally any radio access points of mobile radio networks can be used.

Information that is representative of components of the localization information such as, for instance, the transmit power or the signal strengths, can especially comprise the appertaining components of the localization information, or else it comprises information from which the components of the localization information can be acquired. The term "components of the localization information" refers especially to any data elements encompassed by the localization information.

The localization information comprises signal pattern information that contains a received signal strength of a signal from at least one other radio access point and/or a received identifier of the other radio access point, and that the first radio access point is configured to acquire the signal pattern information and to transmit it to the unit. In this manner, the radio access points can be used as measuring units for acquiring reference signal pattern information that can be used for a localization on the basis of pattern recognition.

In order to acquire signal pattern information, the existing hardware of a radio access point such as, for instance, the antenna and the processing units that are present can be used to evaluate signals received via the antenna. However, as a rule, radio access points cannot be operated as access points to a communication network while, at the same time, receiving and evaluating radio signals from other radio access points. Therefore, one embodiment of the system and of the method provides that the first radio access point can be operated in a first mode of operation in which it serves as an access point to a communication network, and that the first radio access point can be operated in a second mode of operation in which the signal pattern information can be acquired.

In one embodiment of the system and of the method, it is provided that the localization information contains information about the transmit power of the first radio access point, and that the first radio access point is configured in such a way that information that is representative of the transmit power of the radio access point is transmitted to the unit. By employing the actual transmit power of radio access points that has been ascertained in this manner, the localization of a terminal device can be carried out with high precision by lateration. As already mentioned, the transmit power is a configuration parameter that, as a matter of principle, cannot be determined by measurements and that cannot be readily ascertained by a user. Via the proposed communication connection between a radio access point and the unit that provides the localization information, the transmit power or information that is representative thereof, however, can be read out in a simple manner and made available for the localization.

In order to be able to continuously provide current localization information for the localization of terminal devices, one embodiment of the system and of the method provides that the first radio access point is configured in such a way that the signal pattern information and/or the information that is representative of the transmit power is reported to the reference value unit in prescribed, especially regular, time intervals. In this embodiment, current localization information can be continuously acquired and it can be provided quickly and reliably when a terminal device is to be located.

Another embodiment is characterized in that, upon request by the unit, the first radio access point is configured in such a way that the signal pattern information and/or the information that is representative of the transmit power is transmitted to the unit. A related embodiment provides that the unit is configured in such a way that the request is transmitted to the first radio access point based on a localization of a terminal device that is to be carried out.

In this manner, in comparison to a regular transmission of the components of the localization information or of information that is representative thereof, as a rule, the data transmission volume between the radio access points and the unit can be altogether reduced, since as a rule, the radio signals from a large number of radio access points are not used very frequently for the localization of terminal devices.

As explained above, for the Wi-Fi-based localization on the basis of pattern recognition, the positions where the reference signal patterns were detected are also used. Here, these are the positions of the radio access points that acquire the signal pattern information. The localization on the basis of lateration makes use of the positions of the radio access points that are taken into consideration. Therefore, in one embodiment of the method and of the system, it is provided that the localization information additionally comprises information about the position of the first radio access point.

The positions of the radio access points can fundamentally be detected in different ways. For example, the users of the radio access points can provide the positions. Particularly when it comes to radio access points that are operated by customers of a service provider, one embodiment of the system and of the method provides that position information is acquired on the basis of the address of a user of the first radio access point, whereby the address is read out of a user database. In this manner, especially a provider of a data service can access the customers by radio access points that determine the positions of the radio access points in a simple manner.

Moreover, one embodiment of the system and of the method is characterized in that the information that is representative of components of the localization information is transmitted from the radio access point to the unit, at least partially by a remote administration protocol. In this process, the use of a remote administration protocol is especially advantageous for the transmission of configuration parameters of a radio access point such as for instance, information that is representative of the transmit power and/or transmission of an identifier of the radio access point (optionally together with information about the transmit power), since as a rule, remote administration protocols already allow the transmission of such parameters. Moreover, remote administration protocols already offer the possibility of communication with radio access points that, in this case, can be used for the transmission of the information that is representative of the components of the localization information. Optionally, if the remote administration protocol does not already provide for the transmission of information, it can be expanded, so that it can be used for the transmission of information.

In one embodiment of the techniques described herein, the system also comprises a localization unit that is configured to determine—as a function of the signal pattern information—the position of the terminal device as an approximation on the basis of the signal strength of a radio signal from at least one radio access point that has been detected in a terminal device. This constitutes a localization by pattern recognition. In another embodiment, the system also comprises a localization unit that is configured to determine the position of the terminal device as an approximation on the basis of signal strengths of radio signals that have been detected in a terminal device and that come from at least three radio access points as a function of information about the transmit power of the radio access points. This constitutes a localization by lateration.

In the two above-mentioned embodiments, the same localization unit can be used that can contain modules for carrying out both localization methods. The localization unit can be contained in the terminal device that is to be located and can be connected via the communication network to the unit that provides the localization information. By the same token, the localization unit can be present, for example, in the unit that provides the localization information. In this case, the terminal device that is to be located can transmit information via the communication unit about the radio signals that have been received and that are to be used for the localization.

The above-mentioned and additional advantages, special features and practical refinements of the techniques described herein are also explained on the basis of embodiments, which are described below with reference to the figures.

BRIEF DESCRIPTION OF THE DRAWINGS

FIG. 2 is a schematic illustration of a connection of the radio access points shown in FIG. 1 to a service provider network and to a wide area network, as well as a central unit that provides localization information.

DETAILED DESCRIPTION OF SPECIFIC EMBODIMENTS

Figure 1:
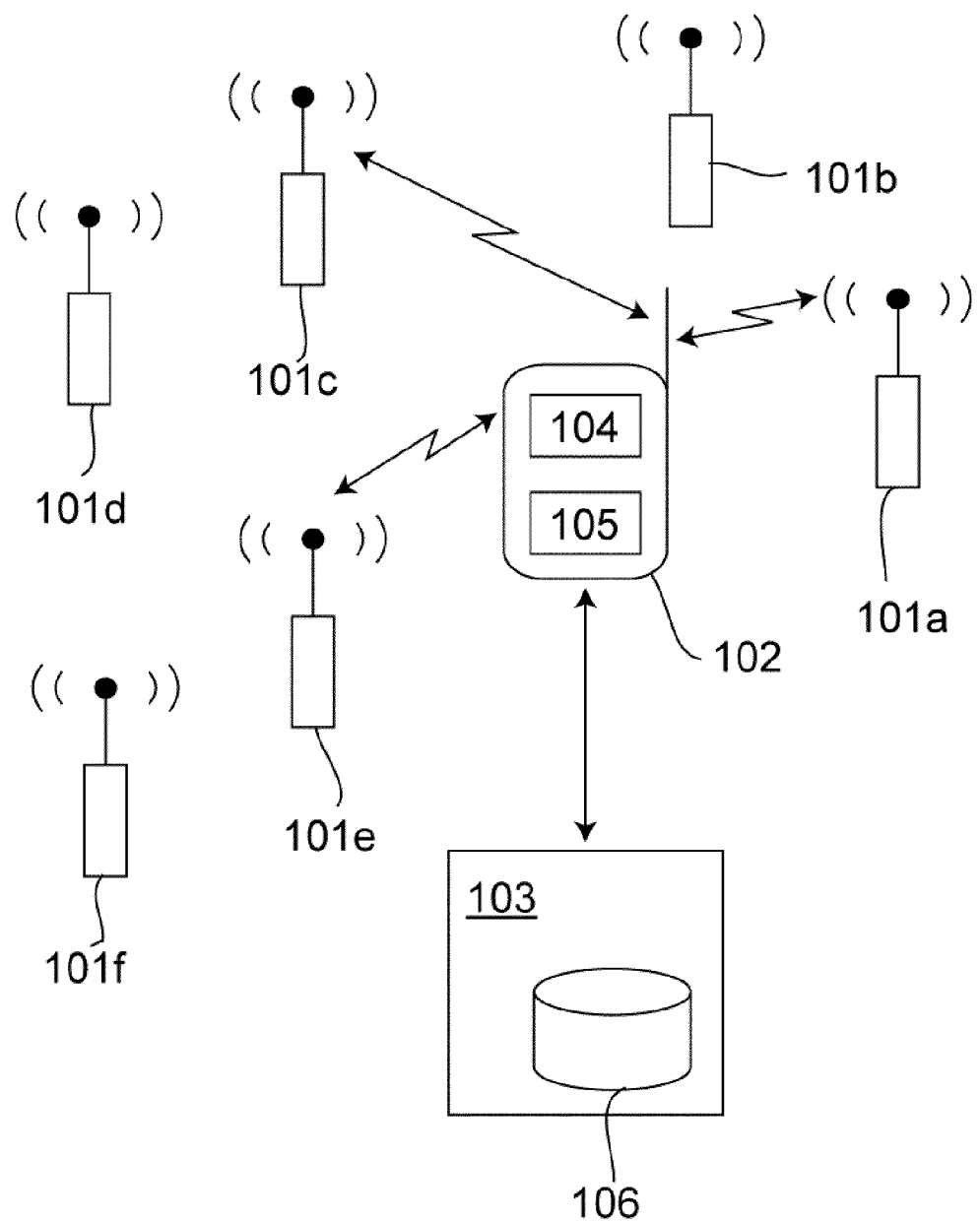
FIG. 1 is a schematic depiction of a system for the localization of terminal devices on the basis of radio signals from radio access points.

FIG. 1 schematically shows a number of radio access points 101$i$ (in FIG. 1 by way of example i=a, ..., f) in an area where mobile terminal devices 102—one of which is illustrated by way of an example in FIG. 1—can be located by measuring the signals from the radio access points 101$i$. In one embodiment, the radio access points 101$i$ are Wi-Fi-capable or WLAN-capable access points 101$i$ that operate according to a standard of the IEEE 802.11 family. The radio access points 101$i$ can be operated, for example, in the residences or at the business premises of customers of a provider of data service that can be accessed via the radio access points 101$i$. As an alternative or in addition, the system shown in FIG. 1 can comprise radio access points 101$i$ that are operated in public places, for example, in shopping arcades, train stations, airports, convention centers, cafés or the like.

At a position that is to be located by a Wi-Fi-based localization method, a mobile terminal device 102 receives radio signals from some of the radio access points 101$i$, and these signals are evaluated for localization purposes. In addition to the radio signals from the radio access points 101$i$, localization information that is provided by a central unit 103 is also employed for localization purposes. The terminal device 102 that is to be located is connected to the central unit 103 in a suitable manner. The connection can be established, for example, via one of the radio access points 101$i$ or via a mobile radio network (not shown in the figure) into which the mobile terminal device 102 has logged in.

As the schematic depiction of FIG. 2 illustrates for an example of a radio access point 101$i$, terminal devices 102 that are connected to the radio access points 101$i$ can access a wide area network (WAN) 201, especially the Internet, via the radio access points 101$i$. Data connections to the wide area network 201 are established via an access server 202 that is operated by the data service provider for access to the wide area network and that is located in a service provider network 203 that is connected to the wide area network 201. Here, the radio access points 101i can be connected to the wide area network 201 via a service provider network 203. Fundamentally, however, it is likewise possible for the radio access points 101i to be connected to the wide area network 201 via several different service provider networks 203, which can also be operated by several different service providers.

As shown in FIG. 2 by way of an example of one of the radio access points 101i, the radio access points 101i have a radio interface 204 with an antenna 205 for transmitting and receiving radio signals as well as a control unit 206 for controlling the data transmission via the antenna. The radio access points 101i are connected to the service provider network 203 via a landline. The data transmission can take place, for example, via a DSL (Digital Subscriber Line) connection. In this case, a DSL modem is integrated into the radio access point 101i, or else the radio access point 101i is connected to such a DSL modem with which the service provider network 203 is accessed via a DSLAM (DSL Access Multiplexer). By the same token, however, other transmission technologies can also be used. For example, the service provider of the data service and the operators of the service provider network 203 can make the radio access points 101i available to their customers. Likewise, operators can, of course, also obtain the radio access points 101i in another manner.

For purposes of Wi-Fi-based localization of the terminal devices 102, use is made of the above-mentioned beacon signals from the radio access points 101i that are transmitted by the radio access points 101i at regular time intervals. As already mentioned, the beacon signals each contain an unambiguous identifier of the transmitting radio access point, especially a BSSID (Basic Service Set Identification). The identifier can also be read out of the radio signal by a terminal device 102, even if the terminal device 102 is not logged in at the radio access point 101i, that is to say, even if the terminal device 102 is not using the radio access point 101i for data exchange with the wide area network 201 or with the service provider network 203. In particular, a terminal device 102 can read out the identifier, even if a protected radio access point 101i is involved in which the access possibility is limited to specially authorized users—for example, through the use of a password and/or special terminal device filters such as MAC filters—and the terminal device 102 does not have authorization to gain access.

The terminal devices 102 that can be used and located in the system can be configured, for example, as mobile phones, smartphones, tablet PCs, notebook computers or the like. For communication with the radio access points 101i, the terminal devices 102 have radio adapters 104 with which radio signals from the radio access points 101i can be received, and with which radio signals can also be transmitted to the radio access points 101i. In order to evaluate the beacon signals, the radio adapter 104 has a module for reading out the contained identifier. Moreover, the radio adapter 104 is configured to determine the signal strength of the radio signals received from the radio access points 101i, especially the received beacon signals. In addition to the radio adapter 104 for establishing connections to the radio access points 101i, the terminal devices 102 can also contain other communication interfaces for mobile data exchange such as, for instance, radio modules for connection to a mobile radio network, which is not shown in the figures. In this manner, the terminal devices 102 can also connect to devices in the wide area network 201 or in the service provider network 203 via one of the radio access points 101i, without using a data connection, for example, even if they are not authorized to use the available radio access points 101i.

The system shown in FIG. 1 also comprises a central unit 103 to provide localization information that is employed to locate terminal devices 102 on the basis of the radio signals from the radio access points 101i. In the embodiment shown, the central unit 103 is operated by the provider of the data service in the service provider network 203, so that this service provider can also offer a localization service in addition to the data service. By the same token, however, it can also be provided that the data service and the localization service are offered by different service providers. During the localization of the terminal device 102, data is exchanged between the terminal device 102 and the central unit 103. For this purpose, as mentioned above, the terminal device 102 can communicate for example, via one of the radio access points 101i, with the central unit 103 or else via another modality of communication such as, for instance, via a mobile radio network (not shown in the figures). As already mentioned, this modality of communication can be used, even if the terminal device 102 is not connected to any of the radio access points 101i or cannot connect to any of the radio access points 101i.

In one embodiment, the localization of the terminal device 102 is carried out by a pattern recognition method. Here, the signal strengths of the radio signals, especially of the beacon signals—also referred to as RSS values—that have been transmitted by the radio access points 101i are determined in the terminal device 102 and the associated identifiers of the radio access points 101i are read out from the signals. The composition of the RSS values is also referred to here as the signal pattern. For purposes of locating the terminal device 102, a localization unit 105 compares the received signal pattern to reference signal patterns that are provided by the central unit 103. Each of the reference signal patterns is associated with a position where the reference signal pattern was detected. Then the localization unit 105 determines the approximate position of the terminal device 102 on the basis of a comparison between the detected signal pattern and the reference signal patterns. Various methods that are generally known to the person skilled in the art can be used for this purpose. Examples of such methods are Nearest Neighbors in Signal Space (NNSS) methods in which the position is determined on the basis of the Euclidean distance between an RSS vector containing the acquired RSS values and the RSS vectors containing the signal strengths of the reference signal patterns. In particular, as an estimate of the position of the terminal device 102, the position can be determined that is associated with the reference RSS vector with the smallest Euclidean distance to the acquired RSS vector. Additional examples are so-called k-NNSS methods in which, instead of one single reference pattern with an RSS vector with the smallest Euclidean distance to the acquired reference value, several reference patterns for adjacent positions—especially k adjacent positions—are included in the position determination, as well as so-called smallest polygon methods.

As an alternative or in addition to the localization by pattern recognition, the localization unit 105 can also perform a lateration of the kind fundamentally known to the person skilled in the art in order to estimate the position of the terminal device 102. The prerequisite for the lateration is that radio signals must be received from at least three different radio access points 101i in the terminal device 102 that is to be located. Within the scope of the lateration, the position of the terminal device 102 is ascertained approximately as the intersection of three circles whose mid-points each contain a radio access point 101i whose radio signals are received in the terminal device 102. The radii of the circles each correspond to the distance between the terminal device 102 and the associated radio access point 101*i*.

In order to estimate the position of the terminal device 102 on the basis of lateration, the terminal device 102 determines the identifiers of at least three radio access points 101*i* whose radio signals are received in the terminal device 102. The central unit 103 then provides the localization unit 105 with the positions of the radio access points 101*i* that can be stored in the database 106, for example, together with the associated identifiers. If radio signals from more than three radio access points 101*i* have been detected in the terminal device 102, then it can be provided that three radio access points 101*i* are selected for the lateration, either randomly or according to a prescribed criterion, and the remaining radio access points 101*i* are no longer taken into consideration. A possible criterion can stipulate, for example, that only the three radio access points 101*i* with the highest signal strengths are taken into consideration. The radio access points 101*i* taken into account for the lateration can already be selected when the radio signals are detected in the terminal device 102, or else in the central unit 103 or in the localization unit 105.

The distances between the terminal device 102 and the radio access points 101*i* that are to be taken into account as circle radii for the lateration are each determined on the basis of the received signal strength of the radio signal, especially the beacon signal, transmitted by the radio access point 101*i*, and also as a function of the transmit power of the radio access points 101*i*, which is likewise provided by the central unit 103, as will be explained in greater detail below. In order to determine the distance on the basis of the transmit power and on the basis of the received signal strength, the localization unit 105 can use a prescribed estimated relationship for the drop in the signal strength as a function of the distance to the radio access point 101*i*. As an approximation, the distance can be determined, for example, under the assumption that the radio signals are propagating in free space. If there are only slight interferences in the signal propagation, resulting, for instance, from obstructions in the signal path, a lateration can thus be carried out in which the precision of the determined position of the terminal device 102 is within a range of 10 meters or better.

In the embodiment shown in FIG. 1, the localization unit 105 for ascertaining an estimated value for the position of the terminal device 102 is arranged in the terminal device 102 and can be configured, for example, as software that runs in a processor of the terminal device 102. In this embodiment, the received identifiers of radio access points 101*i* as well as the measured signal strengths are transferred to the localization unit 105 within the terminal device 102. Reference signal patterns and associated positions or transmit powers and positions of detected radio access points 101*i* are transmitted by the central unit 103 to the localization unit 105 in the terminal device 102. This is done, for example, as a result of an applicable request that is transmitted by the terminal device 102 to the central unit 103. The data in the central unit 103 that is to be transmitted to the localization unit 105 is selected, for instance, on the basis of the identifiers of the radio access points 101*i* that are received in the terminal device 102 and that can be transmitted by the terminal device 102 to the central unit 103 in order to make the selection. In the central unit 103, for example, the transmit powers and positions of the radio access points 101*i* identified by the transmitted identifiers or else the reference patterns with RSS values of radio signals from these radio access points 101*i* and the associated positions can then be transmitted to the localization unit 105.

In an alternative embodiment, the localization unit 105 can also be arranged in the central unit 103. In this manner, the localization can be carried out, even if the terminal device 102 has limited computing capabilities. In this embodiment, the terminal device 102 transmits the received identifiers of the radio access points 101*i* as well as the measured signal strengths to the central unit 103, together with a localization request. There, the localization unit 105 computes the position of the terminal device 102 in the manner described above, and reports this back to the terminal device 102.

In order to acquire components of the localization information used for the localization of the terminal device 102, in the system shown in FIG. 1, the radio access points 101*i* that can communicate with the central unit 103 are used for this purpose. As shown in FIG. 2, the central unit 103 comprises a communication unit for this purpose, which is configured to communicate with the radio access points 101*i* by a suitable communication protocol as well as to receive localization information from the radio access points 101*i* that has been acquired in the radio access point 101*i*.

In one embodiment, the localization information reported by a radio access point 101*i* to the central system comprises the momentary transmit power of the radio access point 101*i*. In order to indicate the transmit power of the radio access point 101*i*, the latter transmits to the central unit 103 the transmit power data in a message together with the identifier of the radio access point 101*i*. The transmit power data can directly indicate the transmit power or it can contain information from which the central unit 103 can determine the transmit power. Thus, for example, it can be provided that the transmit power at the radio access point 101*i* can be set as a fraction or as a percentage of a device-specific maximum transmit power. In such a case, the transmit power data can, for example, indicate the fraction that has been set. In addition, the radio access point 101*i* can indicate the maximum transmit power or else a device name on the basis of which the central unit 103 determines the maximum transmit power of the device from a table in which the maximum transmit power of the device is indicated. Based on the information obtained, the central unit 103 can then determine the momentary transmit power of the radio access point 101*i*.

In one embodiment, the radio access point 101*i* reports to the central system 103 the transmit power on the basis of transmit power data, irrespective of a localization or position determination that is to be carried out for a terminal device 102, and the transmit power, together with the likewise reported identifier of the radio access point 101*i*, is stored in a database 106 of the central unit 103. When the localization of a terminal device 102 is to be performed on the basis of lateration employing the radio signals from the radio access point 101*i*, then the transmit power is read out of the database 106 and provided to the localization unit 105 in the manner described above for purposes of the localization.

The transmit power is a configuration parameter of a radio access point 101*i* that can be changed. In order to be able to use the up-to-date transmit power of the radio access point 101*i* for the position determination, it can be provided that the radio access point 101*i* reports the transmit power on the basis of applicable transmit power data in prescribed—and in some embodiments regular—time intervals to the central unit 103, and the central unit 103 adapts the database entry containing the transmit power when it ascertains a change in the transmit power as compared to the previously stored value. The regular reports can either be initiated by the radio access point 101*i* or can be made on the basis of requests that the central unit 103 transmits to the radio access point 101*i*. If the radio access point 101*i* supports this, it can also be provided that only reports about changes in the transmit power are transmitted to the central unit 103 and are then used by the central unit 103 in order to update the applicable database entry. An advantage of this embodiment is that, in the central unit 103, the most up-to-date transmit power of the radio access point 101*i* is always available and the required reports of the radio access point 101*i* can be reduced.

In another embodiment, the transmit power data is transmitted whenever a terminal device 102 is to be located. For this purpose, the central unit 103 requests the transmit power data from the radio access point 101*i* when it receives a localization request from a terminal device 102 or a request from a terminal device 102 to provide localization information for a lateration procedure. On the basis of the transmit power data that the radio access point 101*i* transmits as the response to the request, the central unit 103 determines the transmit power of the radio access point 101*i* and forwards this to the localization unit 105, which performs the localization procedure. This embodiment has the advantage that the transmit power only has to be reported by the radio access point 101*i* if this is needed for the localization of a terminal device 102. Fundamentally, however, providing the transmit power for the localization unit 105 takes longer than in the case in which the transmit power information is stored in the database 106.

In one embodiment, a remote administration protocol is used for the transmission of the transmit power data from the radio access points 101*i* to the central unit 103, and this remote administration protocol can be used for the remote administration of electronic communication devices. In particular, the TR-069 protocol is used, which is generally known to the person skilled in the art and whose specifications are published by the Broadband Forum (formerly the DSL Forum), and that is intended mainly for the remote administration of access devices such as modems, routers and especially radio access points.

Thanks to remote administration, the radio access points 101*i* and other devices can be configured by a remote unit via the network connection of the devices. Especially configuration parameters of the remotely administered devices can be read out and modified, making use of the remote administration protocol. In a radio access point 101*i*, such configuration parameters normally comprise transmit power data so that remote administration protocols often already provide the capability for reading out the transmit power data that can be used here. For example, the above-mentioned TR-069 protocol provides the parameter "InternetGatewayDevice.LANDevice.{i}.WLAN-Configuration.{i}.TransmitPower". For the transmission of the transmit power data, the remote administration protocol can also be "made use of" without new interfaces having to be set up for the data transmission. The use of a remote administration protocol for the data transmission to the central unit 103 is advantageous especially when a remote administration of the radio access points 101*i* by a configuration server 207 is provided that—as shown in FIG. 2 by way of an example—is arranged in the service provider network 203. In this case, the communication between the radio access points 101*i* and the central unit 103 takes place via the configuration server 207 (dotted arrows in FIG. 2).

As an alternative or in addition to the transmit power data, the radio access points 101*i* of the system shown in FIG. 1 can transmit to the central unit 103 reference pattern data that is used for the localization on the basis of pattern recognition. In this embodiment, the radio access points 101*i* are configured to detect radio signal patterns that comprise signal strengths of radio signals as well as the identifiers of surrounding radio access points 101*i* at their installation site, and to report the detected radio signal patterns to the central unit 103. Therefore, the radio access points 101*i* can be employed as stationary measuring devices in order to acquire reference signal patterns.

In order to detect the signal pattern data, the beacon signals from the surrounding radio access points 101*i* are received by a radio access point 101*i* and evaluated. For this purpose, the radio access point 101*i* scans all of the usable radio channels in a manner similar to the communication terminal devices 102 in the search for available radio access points 101*i*. For purposes of receiving the beacon signals, the radio access point 101*i* is operated in a client mode. In this mode, the radio interface 204 of the radio access points 101*i* is used to receive radio signals from other radio access points 101*i*. This can especially be achieved by appropriately adapted firmware of the radio access point 101*i*. An example of suitable firmware that can be used in the radio access points 101*i* of the system in order to allow the detection of radio signal patterns is the generally known free radio firmware for radio access points 101*i* that is used in so-called free radio networks. In the client mode, a radio access point 101*i* has functionalities that are also provided by the radio adapters 104 of Wi-Fi-capable terminal devices 102, but this normally does not offer terminal devices 102 the possibility of access to the radio access point 101*i* in order to establish data connections to the service provider network 203 or to the wide area network 201. Therefore, it is provided that the radio access points 101*i* are only briefly operated in the client mode in order to detect signal pattern data. For the rest, the radio access points 101*i* are operated in a "normal" mode of operation in which terminal devices 102 can establish data connections especially to the wide area network 201 via the radio access points 101*i*.

In one embodiment, it is provided that the radio access points 101*i* detect the radio signal patterns in prescribed, especially regular, time intervals and transmit them to the central unit 103. In the central unit 103, in each case, the last of the radio signal patterns transmitted from the radio access points 101*i* are stored as reference signal patterns in the database 106. In this manner, a data record containing localization information comprising reference signal patterns can be established in the database 106 by using the radio access points 101*i*. Access will then be made to individual reference signal patterns that are stored in the database 106 whenever a localization of a terminal device 102 is to be carried out. Here, for a localization procedure, for example, the reference signal patterns can be used that contain one or more identifiers of a radio access point 101*i*, which have also been acquired by the terminal device 102 at the position that is to be located, and/or the reference signal patterns stored in the database 106 can be used that were reported by a radio access point 101*i* whose identifier is acquired by the terminal device 102 at the position that is to be located. The identifier is indicated by the radio access point 101*i* when the signal pattern data is transmitted to the central unit 103, and it can be stored in the database 106 together with the signal pattern data.

In another embodiment, in addition to or as an alternative to continuous updates in the database 106 of the signal pattern data acquired by a radio access point 101*i*, it is provided that the radio access points 101*i* report the signal pattern data to the central unit 103 on an as-needed basis when a terminal device 102 is to be located. For this purpose, if needed, the central unit 103 can request the signal pattern data from a radio access point 101*i* which then, in a response to the request, transmits the data to the central unit 103 that provides the signal pattern data in the manner already described above for the localization unit 105 that performs the localization.

The request for the transmission of the signal pattern data is sent by the central unit 103 to the radio access point 101$i$ whose signal pattern data is potentially relevant for the localization that is to be carried out. This data can be, for example, the radio access points whose identifiers are received by the terminal device 102 that is to be located and/or radio access points 101$i$ that receive radio signals from other radio access points 101$i$ whose identifiers are received by the terminal device 102 that is to be located. These identifiers can be determined by the radio access points 101$i$, for example, regularly by scans, and reported to the central unit 103. By the same token, the central unit 103 can determine the reference signal patterns that are relevant for the localization in another manner, for instance, on the basis of an estimated position of the terminal device 102 and on the basis of the positions of the radio access points 101$i$. As already explained in conjunction with the transmission of transmit power data, on the one hand, the as-needed transmission of the signal pattern data generally reduces the number of reports to be transmitted by the radio access points 101$i$. On the other hand, however, the time needed before the signal pattern data is available for the localization increases.

For the transmission of the radio signal data, as was the case with the transmission of the signal strength data, functionalities can be employed that can also be used for the remote administration of the radio access points 101$i$. In particular, a remote administration protocol such as the above-mentioned TR-069 protocol, can be used for the transmission, or—if the protocol does not already permit the transmission of signal strengths—an extension of such a protocol. By the same token, however, other protocols can also be used for the transmission of the signal pattern data.

As described above, in addition to the transmit power of the radio access points 101$i$ that are received by the terminal device 102 during the lateration or in addition to the reference signal patterns during the localization on the basis of a pattern recognition, positions of radio access points 101$i$ are also used for the localization of terminal devices 102. During the localization on the basis of a lateration, these are the positions of the radio access points 101$i$ that have been taken into consideration, and during the localization on the basis of pattern recognition, these are the positions of the radio access points 101$i$ that have acquired the reference signal patterns used during the localization. In the system shown in FIG. 1, the positions of the access points 101$i$ are stored in the database 106 of the central unit 103, together with the identifier and, if applicable, together with the reference signal pattern data or transmit power information (if this is permanently stored and not requested for each localization) that has been reported by the access points. When a terminal device 102 is to be located, the positions of the radio access points 101$i$ taken into consideration for the localization are read out of the database 106 and transmitted to the localization unit 105, which carries out the localization.

The positions of the radio access points 101$i$ can be detected in various ways. In one embodiment, the positions are indicated, for example, by the users or operators of the radio access points 101$i$. In particular, the positions can be determined from addresses of the installation sites that are indicated by the users. These can match, for example, the addresses of the residences or business premises of the users who indicate these to the service provider of the data service, before the radio access points 101$i$ they operate are used to locate the terminal devices 102. The information can be provided in conjunction with the localization service of the service provider. However, it can also be provided that the information is given when the customer registers with the data service. As an alternative, the positions can also be acquired by the service provider of the localization service when the radio access points 101$i$ are set up if the radio access points 101$i$ are set up by the service provider. This can be the case, for instance, with publicly accessible radio access points 101$i$ that are operated by the service provider, as well as with radio access points 101$i$ of private persons and companies that make use of a service of the service provider for setting up the radio access points 101$i$. However, other variants for detecting the positions of the radio access points 101$i$ can also be implemented if these would prove to be more practical. In order to determine the positions of the radio access points 101$i$ on the basis of the addresses of the installation sites, geocoding of the kind generally known to the person skilled in the art is used, in which the coordinates of the addresses are determined in a suitable coordinate system.

Although the techniques described herein have been described in detail in the drawings and in the presentation given above, the presentations are merely illustrative and provided by way of example, and should not be construed in a limiting manner. In particular, the techniques described herein are not limited to the explained embodiments. The person skilled in the art can glean additional variants of the techniques described herein and their execution from the preceding disclosure, from the figures and from the patent claims.

In the patent claims, terms such as "encompass", "comprise", "contain", "have" and the like do not exclude additional elements or steps. The use of the indefinite article does not preclude the plural. Each individual device can execute the functions of several of the units or devices cited in the patent claims.

The reference numerals indicated in the patent claims are not to be construed as a limitation of the techniques employed.

The invention claimed is:

1. A system for the localization of a terminal device via radio signals from radio access points that have been received in the terminal device, comprising:
   a unit for providing localization information pertaining to the radio signals from the radio access points, wherein the localization information can be used for the localization of the terminal device; and
   at least a first radio access point that is connected to the unit via a communication connection and that is configured such that information that is representative of components of the localization information is transmitted to the unit, wherein the first radio access point is configured to receive from at least one other radio access point a reference radio signal via a radio channel, and the localization information comprises:
   signal pattern information that contains a received signal strength of the reference radio signal from the at least one other radio access point; and
   a received identifier of the other radio access point, wherein the first radio access point is configured to acquire the signal pattern information and to transmit it to the unit; and
   wherein the terminal device is configured to receive from the at least one other radio access point a radio signal via a radio channel, the terminal device being further configured to transmit information comprising at least a received signal strength and the identifier of the at least one other radio access point to the unit, and wherein the unit is configured to compare the received signal strength of the radio signal received by the terminal device with the reference signal pattern, and wherein the unit is further configured to determine an approximate position of the terminal device based on the comparison of the received signal strength of the radio signal received by the terminal device with the reference signal pattern.

2. The system according to claim 1, wherein:
the first radio access point can be operated in a first mode of operation in which it serves as an access point to a communication network; and
the first radio access point can be operated in a second mode of operation in which the signal pattern information can be acquired.

3. The system according to claim 1, wherein the localization information contains information about the transmit power of the first radio access point, and wherein the first radio access point is configured such that information that is representative of the transmit power of the radio access point is transmitted to the unit.

4. The system according to claim 1, wherein the first radio access point is configured such that the signal pattern information is reported to a reference value unit in prescribed, especially regular, time intervals.

5. The system according to claim 1, wherein the first radio access point is configured such that the signal pattern information is transmitted to the unit because of a request of the unit.

6. The system according to claim 5, wherein the unit is configured in such a way that the request is transmitted to the first radio access point based on a localization of a terminal device that is to be carried out.

7. The system according to claim 1, wherein the localization information additionally comprises information about the position of the first radio access point.

8. The system according to claim 7, wherein the position information is ascertained on the basis of the address of a user of the first radio access point, wherein the address is read out of a user database.

9. The system according to claim 8, wherein the information that is representative of components of the localization information is transmitted from the radio access point to the unit, at least partially via a remote administration protocol.

10. The system according to claim 1, further comprising a localization unit that is configured to determine the position of the terminal device as an approximation on the basis of a signal strength of a radio signal that has been detected in the terminal device and that comes from at least one radio access point as a function of the signal pattern information.

11. The system according to claim 1, further comprising a localization unit that is configured to determine the position of the terminal device as an approximation on the basis of the signal strengths of radio signals that have been detected in a terminal device and that come from at least three radio access points as a function of information about the transmit power of the radio access points.

12. The system according to claim 1, wherein the radio access points comprise:
Wi-Fi access points;
radio access points to a mobile radio network; or
any combination thereof.

13. A method for acquiring localization information pertaining to radio signals from radio access points, wherein the localization information can be provided by a unit and can be used for the localization of the terminal device via the radio signals from the radio access points, comprising transmitting information that is representative of components of the localization information to the unit by a first radio access point via a communication connection, and receiving by means of the first radio access point a reference radio signal via a radio channel from at least one other radio access point, and wherein the localization information comprises signal pattern information that contains a received signal strength of the reference radio signal from the at least one other radio access point and a received identifier of the at least one other radio access point, and wherein the first radio access point acquires the signal pattern information and transmits it to the unit;
receiving by means of the terminal device from the at least one other radio access point a radio signal via a radio channel;
transmitting by means of the terminal device information comprising at least a received signal strength and the identifier of the at least one other radio access point to the unit;
comparing by means of the unit the received signal strength of the radio signal received by the terminal device with the reference signal pattern; and
determining an approximate position of the terminal device based on the comparison of the received signal strength of the radio signal received by the terminal device with the reference signal pattern.

* * * * *